Jan. 1, 1963   J. A. HINCKLEY ETAL   3,071,098
CABLE CUTTER
Filed April 8, 1959   8 Sheets-Sheet 2
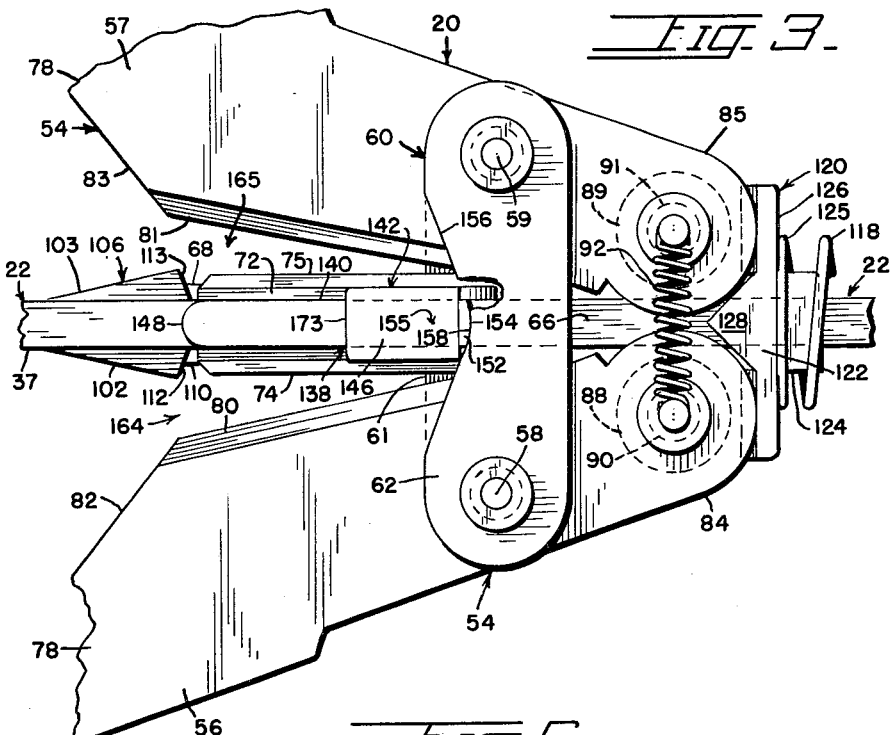
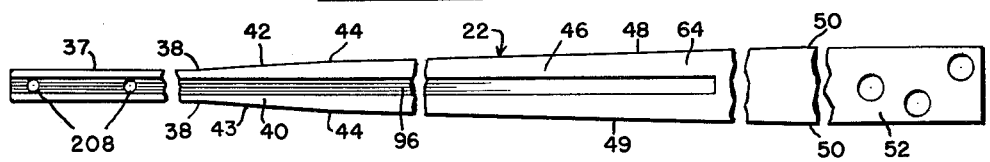
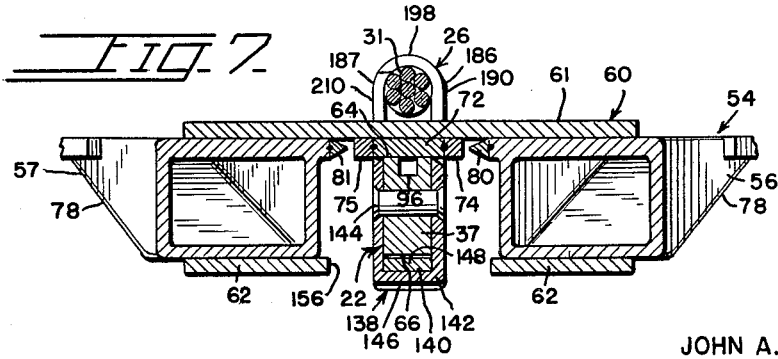
JOHN A. HINCKLEY
WILLIAM J. LEIGHTY
INVENTORS
BY
ATTORNEYS

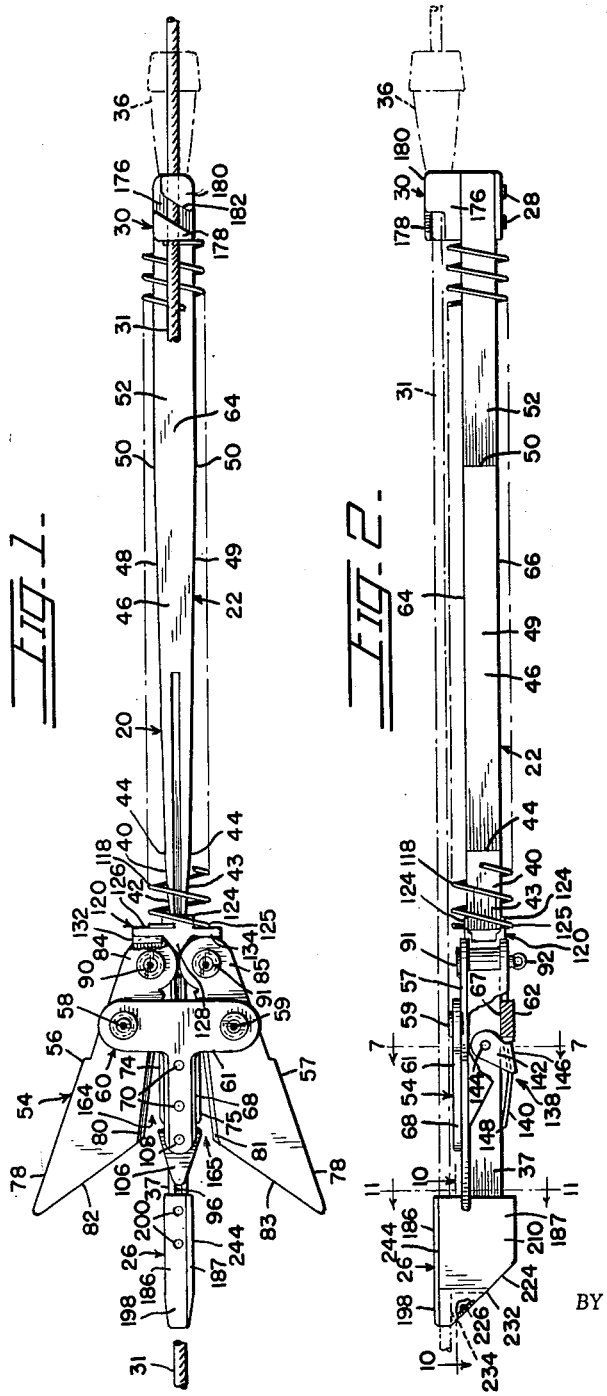

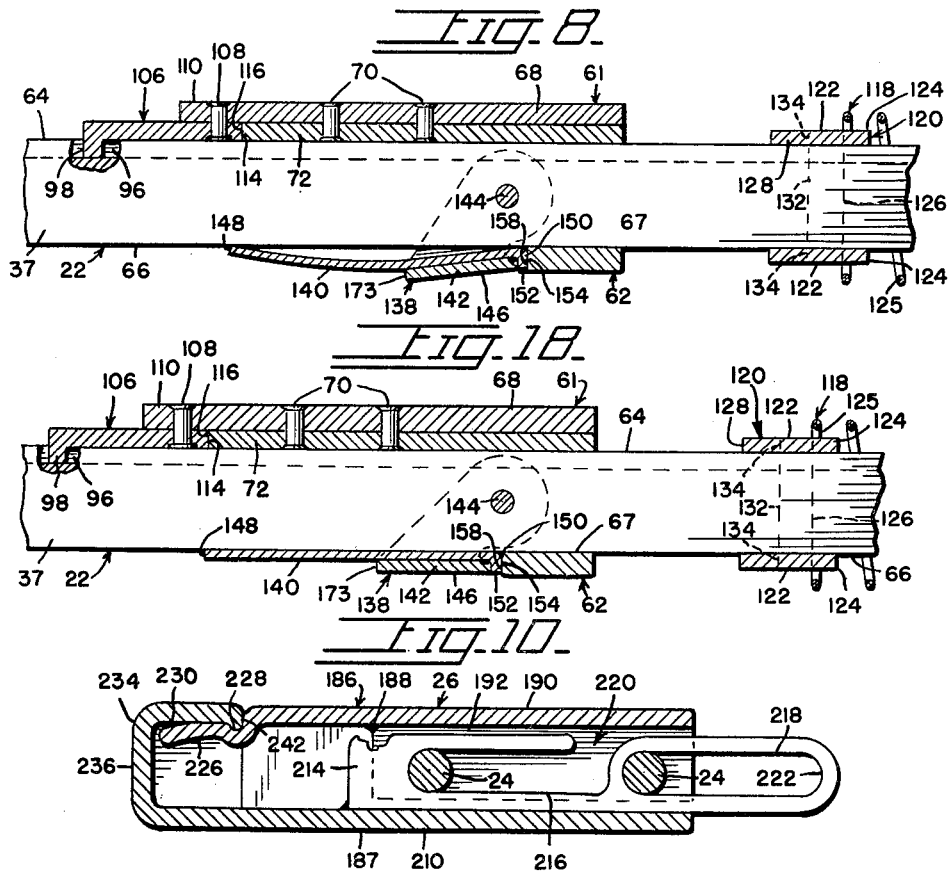
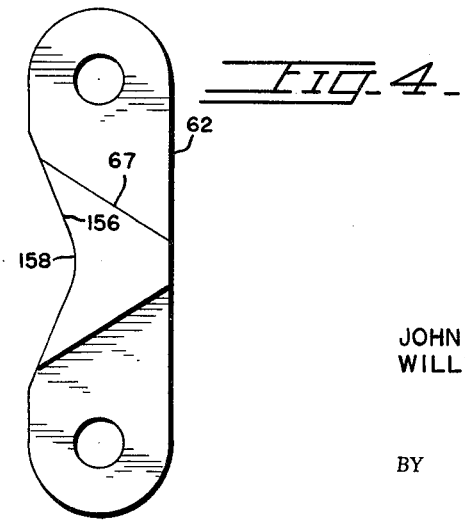

Jan. 1, 1963 J. A. HINCKLEY ETAL 3,071,098
CABLE CUTTER

Filed April 8, 1959 8 Sheets-Sheet 4

JOHN A. HINCKLEY
WILLIAM J. LEIGHTY
INVENTORS

BY

ATTORNEYS

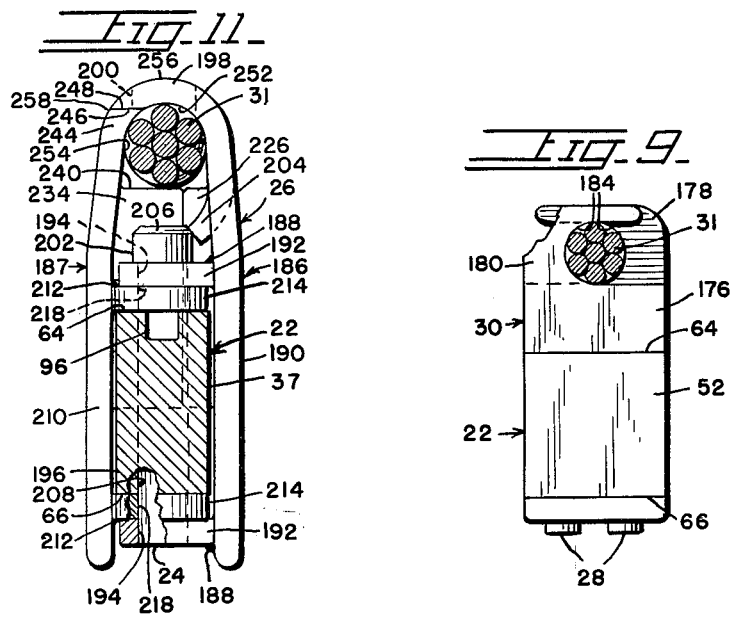
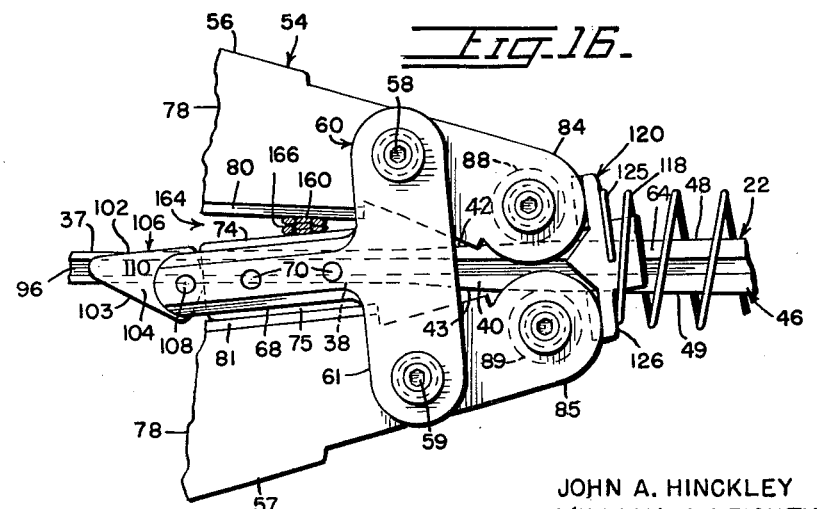

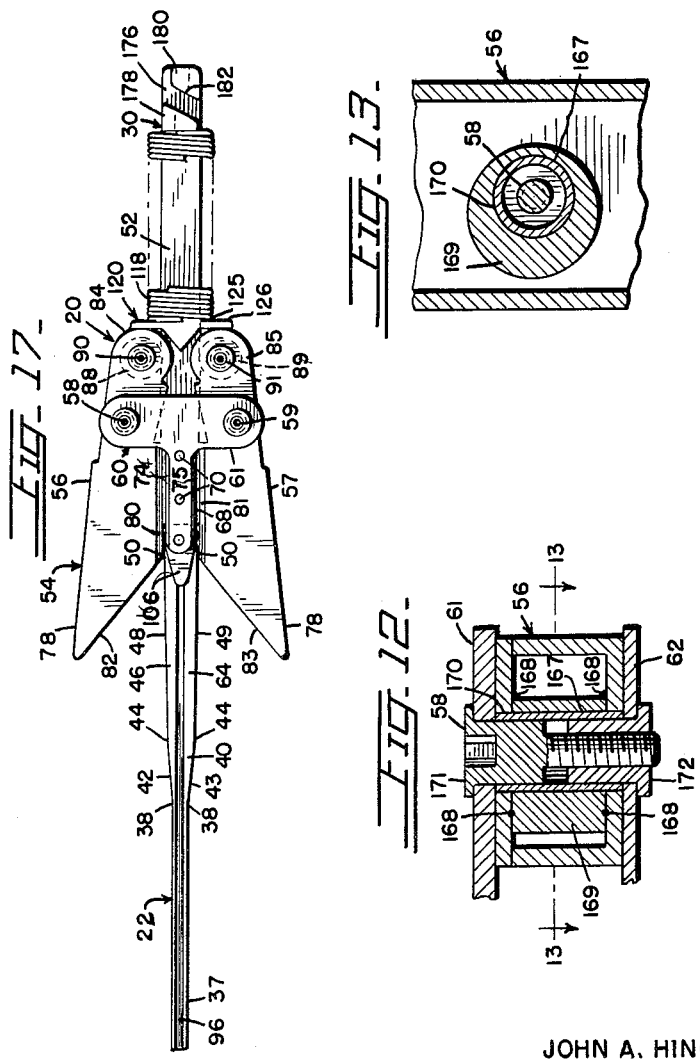

Jan. 1, 1963  J. A. HINCKLEY ETAL  3,071,098
CABLE CUTTER
Filed April 8, 1959  8 Sheets-Sheet 7
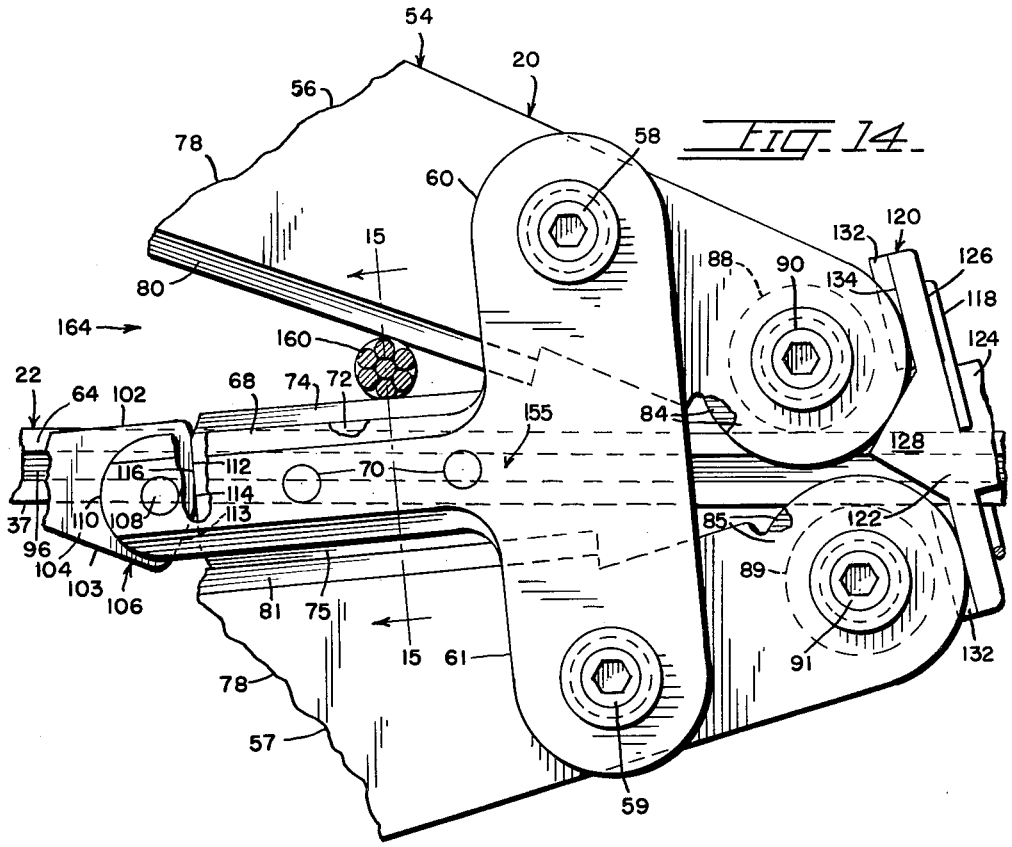
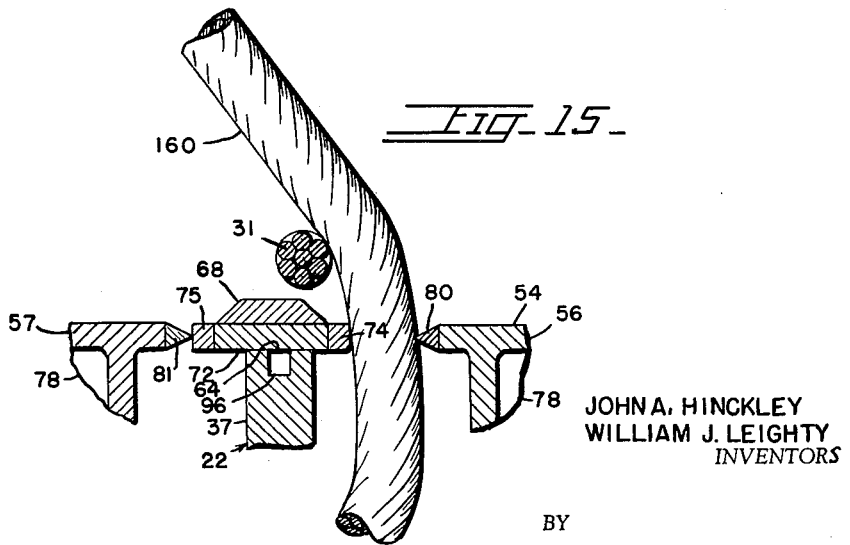
JOHN A. HINCKLEY
WILLIAM J. LEIGHTY
INVENTORS
BY
ATTORNEYS Jan. 1, 1963   J. A. HINCKLEY ETAL   3,071,098
CABLE CUTTER
Filed April 8, 1959   8 Sheets-Sheet 8
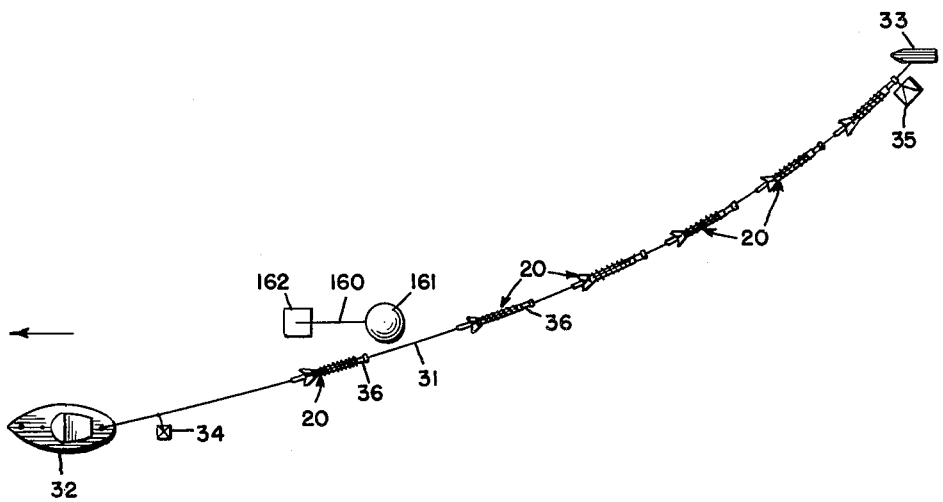
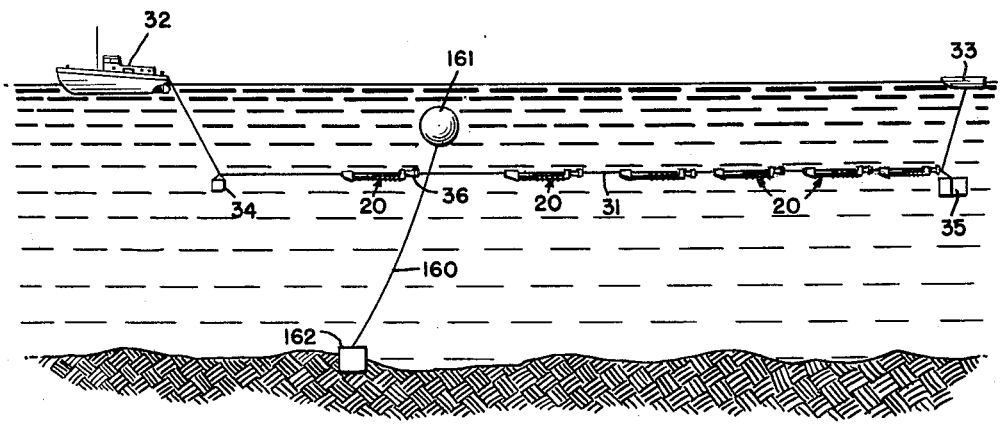
INVENTORS
JOHN A. HINCKLEY
WILLIAM J. LEIGHTY
BY *Louis Sheldon*
ATTORNEY United States Patent Office 3,071,098
Patented Jan. 1, 1963

3,071,098
CABLE CUTTER
John A. Hinckley, Beverly Shores, Ind., and William J. Leighty, Orlando, Fla., assignors, by mesne assignments, to the United States of America as represented by the Secretary of the Navy
Filed Apr. 8, 1959, Ser. No. 805,105
24 Claims. (Cl. 114—221)

This invention relates to mine sweeping, and is concerned more particularly with an improved mine mooring cable cutter.

It is an object of the invention to provide a cutter of the character referred to which is equally adapted for use with a sweep line at either side of the towing vessel.

A further object is to provide a cutter adapted to sever a mine mooring cable by a slicing action.

An additional object is to provide a cutter adapted to be hung from a sweep line and having a cutting mechanism at each side so as to be capable of cutting a cable regardless of the direction of the sweep.

Another object is to provide a cutter so constructed as to preclude fouling of the mine mooring cable.

It is also an object to provide a cutter adapted to successively crush and sever a mine mooring cable.

It is a further object to provide a cutter which is adapted to be readily assembled with and disassembled from the sweep line.

It is another object to provide a cutter which is self-cocked after severing a mine mooring cable.

Another object is to provide a cutter of simple, efficient and durable design.

An additional object is to provide a cutter such that a substantial number of them may be supported in a series on a sweep line without undue sagging.

It is also an object to provide a mine mooring cable cutter operative at relatively low towing speeds.

Further objects and advantages of the invention will appear as the description proceeds.

The invention will be better understood upon reference to the following description and the accompanying drawings, wherein:

FIG. 1 is a top plan view of a cutter, cocked ready for service, embodying features of the invention, just prior to being locked in assembly with the sweep line, portions including a portion of the sweep line being omitted to reveal certain details.

FIG. 2 is a side elevation, partly in section, of the structure shown in FIG. 1.

FIG. 3 is an enlarged bottom plan view of a part of FIG. 1.

FIG. 4 is a top plan view of the link member shown in FIG. 3.

FIG. 6 is a top plan view of the wedge rod per se.

FIG. 7 is an enlarged fragmentary sectional view taken on the line 7—7 in FIG. 2.

FIG. 8 is an enlarged fragmentary sectional view taken on the line 8—8 in FIG. 5 and shows the shock absorber ready for action.

FIG. 9 is an enlarged rear end elevation of the rear hanger.

FIG. 10 is an enlarged plan sectional view taken on the line 10—10 in FIG. 2.

FIG. 11 is an enlarged end view, partly in section and partly in elevation, taken as indicated by the line 11—11 in FIG. 2.

FIG. 12 is an enlarged fragmentary sectional view taken on the line 12—12 in FIG. 5 and turned 90°.

FIG. 13 is a sectional view taken on the line 13—13 in FIG. 12.

FIG. 14 is an enlarged top plan view similar to FIG. 5 but with certain parts shifted by the mooring cable shortly before commencement of the cable-crushing phase.

FIG. 15 is a sectional view taken on the line 15—15 in FIG. 14 and turned 90°.

FIG. 16 is similar to FIG. 14 but shows certain parts further shifted and the mooring cable near the completion of the crushing phase.

FIG. 17 is similar to FIG. 16 but shows the relation of the corresponding parts just at the completion of the cutting of the mine mooring cable and before the inception of the return stroke of the cutting head.

FIG. 18 is similar to FIG. 8 but shows the relation of the corresponding mechanism at the completion of the return stroke of the cutting head and completion of the absorption of the shock at the terminal part of the return stroke.

FIG. 19 is a schematic top plan view of a mine sweeper and gang of cutters towed thereby.

FIG. 20 is an elevational view of the same.

Figure 5:
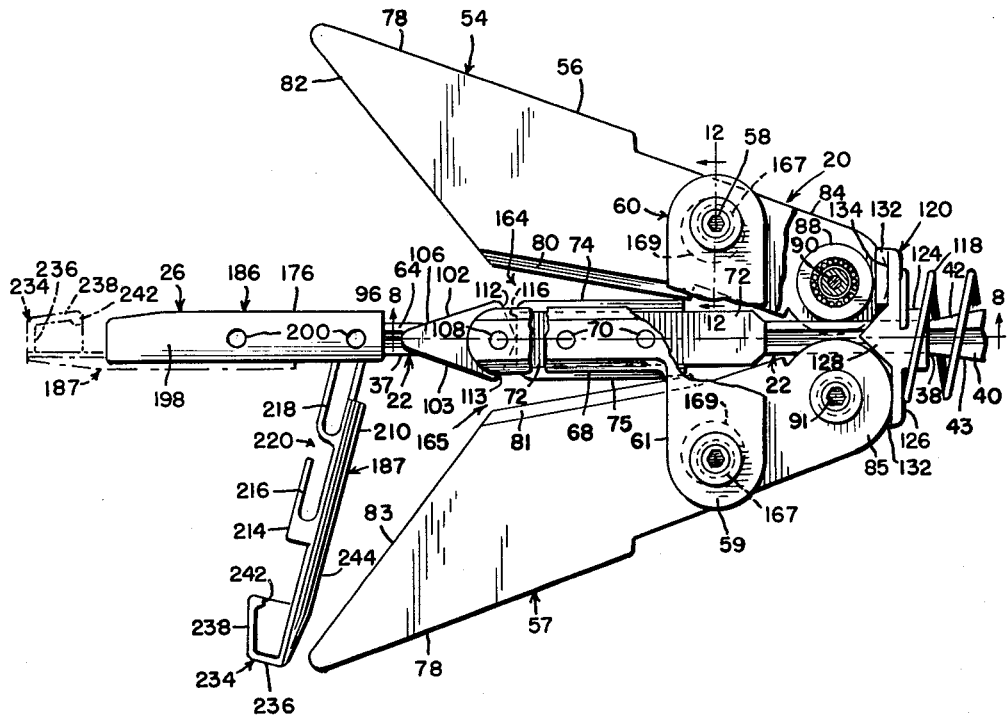
FIG. 5 is an enlarged top plan view of a part of FIG. 1, but with the front hanger unlatched.

Referring now more particularly to the drawings, disclosing an illustrative embodiment of the invention, there is shown at 20 a cable cutter which for convenience will be considered as having its front and rear ends at the left and right, respectively, as seen in FIG. 1. The cutter 20 comprises a wedge rod 22 to which is fastened as at 24 (FIGS. 6, 10, and 11) a front hanger 26 and at 28 a rear hanger 30. A sweep line 31 towed by a mine sweeper 32 (FIGS. 19 and 20) and connected to a float 33 has an intermediate portion held below sea level as by a depressor 34 and an otter 35 and passing through the hangers 26 and 30 and acts in the fashion of a monorail swingably supporting a series of cutters 20. The line 31 has knobs or heads 36 (FIGS. 1, 2, 19, and 20) against which the rear hangers 30 of successive cutters 20 are respectively adapted to abut.

The rod 22 may be of uniform height and, as shown in FIGS. 1, 6, 16, and 17, has a relatively narrow front portion 37 of uniform width terminating rearwardly at the narrow front end 38 of a short fast-tapered wedge portion 40 whose ramps 42 and 43 terminate at the front 44 of a relatively long slow-tapered wedge portion 46 whose ramps 48 and 49 terminate at the front 50 of a rear portion 52 of uniform width.

Supported by the rod 22 between the hangers 26 and 30 is a cutter head assembly 54 comprising a pair of levers 56 and 57 fulcrumed about parallel axes at 58 and 59 to a link 60 having upper and lower parts 61 and 62 extending across the top 64 and bottom 66, respectively, of the rod. The lower link part 62 has a central rearwardly converging upper boss 67 (FIGS. 2, 4, 8, and 18) in sliding engagement with the bottom 66 of the rod 22. The upper link part 61 has a forwardly projecting stem or tongue 68 (FIGS. 1, 2, 5, 8, 14, 16, 17 and 18) to the bottom of which is coupled as by dowels 70 a strap 72 slidably engaged with the top 64 of the rod 22 and having integral or integrally united therewith side anvils 74 and 75 (FIGS. 1, 3, 5, 7, and 14 to 17).

The forward portions 78 of the levers 56 and 57 are formed with knife edges or blades 80 and 81 constituting jaws and disposed in juxtaposition to and for cooperation with the preferably blunt faces of the respective jaws or anvils 74 and 75, and, forwardly of the blades, the levers are formed with mine cable guide surfaces 82 and 83 inclined forward and away from the rod 22 (FIGS. 1, 3, 5, and 17). The parallel upper and lower rear portions 84 of the lever 56 and the like portions 85 of the lever 57 slidably engage the top 64 and bottom 66, respectively, of the rod 22. Rollers 88 and 89 (FIGS. 2, 3, 5, 14, 16, and 17) are mounted at 90 and 91 between the respective pairs of lever portions 84 and 85 and are constantly biased into rolling engagement with the sides of the rod 22 by a spring 92 anchored at 90 and 91.

The top 64 of the rod 22 is interrupted by a milled or otherwise formed central longitudinal slot 96 into which slidably projects a lug 98 (FIGS. 8 and 18) depending from the apex or juncture of the forwardly acutely converging side edges 102 and 103 of a trapezium-like guide 106 (FIGS. 1, 3, 5, 8, 14, 16, 17, and 18) ahead of the strap 72, said guide slidably engaging the top 64 of the rod 22. The rear of the guide 106 is pivoted at 108 to the projecting front tip 110 of the tongue 68 and has rearwardly converging obtusely related side edges 112 and 113 having a rounded juncture 114 adapted selectively to abut the front edge 116 of the strap 72.

A coil spring 118 about the rod 22 is confined under initial compression between the rear hanger 30 and a spring end retainer 120 and holds the latter against the rear ends 84 and 85 of the levers 56 and 57 and constantly urges the cutter head assembly 54 forward. The retainer 120 surrounds the rod 22 and has flat top and bottom portions 122 slidably engaged with the top 64 and bottom 66, respectively, of the rod. The retainer portions 122 have rear lugs 124 fitting in the front end 125 of the spring 118, spring-seating shoulders 126 adjacent the lugs, and front arrowheads 128 projecting between the rounded edges of the roller-supporting lever portions 84 and 85. The retainer 120 also has side bosses 132 projecting forward between and in substantially sliding engagement with the lever portions 84 and 85 but clear of the rollers 88 and 89, and shoulders 134 biased by the spring 118 against and tangent to and tending to equalize the spring pressure on said portions. The arrowheads 128 cooperating with the portions 84 and 85 prevent such lateral dislocation of the retainer 120 as might render unequal the pressure on the portions primarily when the cutter head assembly 54 is in the cocked (ready) position shown in FIG. 1.

A shock absorber for the return stroke of the cutter head assembly 54 is indicated generally at 138 (FIGS. 2, 3, 7, 8, and 18) and comprises a normally bowed leaf spring 140 and a yoke 142 straddling and pivoted at 144 about a horizontal axis to an intermediate part of the front rod portion 37. The leaf spring 140 extends between the yoke bight 146 and the rod bottom 66 and bears at its ends 148 and 150 against the rod bottom respectively ahead of and behind the bight, and at its rear end, has a depending lug 152 (FIGS. 2, 3, 8, and 18) having a cylindrically convex rear surface 154 whose axis, indicated by a point at 155 (FIG. 3), is in advance of the plane of the lever fulcrum axes 58 and 59. The front of the lower link part 62 has a notch 156 having a central concave seat 158 biased by the spring 118 to engage the lug surface 154.

When the cutter 20 is idle, the cutter head assembly 54 is symmetrical with respect to the rod 22, as shown in FIGS. 1, 3, and 5. This condition is maintained by reason of the fact that the retainer 120 transmits the pressure of the spring 118 equally to the levers 56 and 57, and this pressure maintains the link seat 158 centered against the shock absorber spring lug 152.

When the mine-mooring cable 160 (FIGS. 14, 15, 16, 19, and 20) is engaged by the sweep line 31, the headway (i.e., sweep) motion of the line, coupled with the inertia of the mine 161 and the immovability of the mine cable anchor 162, cause the cable to be bent over and under the line (FIG. 15). Were the guide 106 not present, the cable 160 could snag against the front end 110 of the tongue 68 and be prevented from moving to a position to be cut. This danger is obviated by the guide 106, along one or the other of whose sides 102 and 103 the cable 160 will slide into a position to be crushed and cut. In the example given, the side 102 guides the cable 160 into such position.

If the guide 106 were not used, moreover, and in the event the cable 160 did not snag against the tongue end 110, the cable as it moved between the rod 22 and the blade 80 would swing the link 60 clockwise (looking downward), and thereby the corresponding anvil 74, to such an extent that the cable would be wedged between the blade and the side of the rod, instead of between the blade and the cooperating anvil, and eventually would be more or less kinked instead of crushed and cut and could conceivably break or spring one or more parts of the cutter head assembly 54. Such a possibility is obviated by abutment of the corresponding edge 112 of the guide 106 with the front end 116 of the anvil strap 72, to limit the swing of the link 60 to such an extent as to insure wedging of the cable 160 between the anvil 74 and the cooperating blade 80. The operation at the other side is the same.

On entering that one of the rearwardly converging spaces or pockets 164 and 165 (defined by the pair of jaws comprising the anvil 74 and blade 80, and by the pair of jaws comprising the anvil 75 and blade 81) which is at the same side of the rod 22 as the cable 160, for example the pocket 164, the cable comes into engagement with the anvil 74 and blade 80 and proceeds during what may be termed the first phase of action of the cutter head assembly 54 to move toward the rear hanger 30 and widen the angle between the anvil 74 and the blade 80 and at the same time correspondingly reduce the angle between the other anvil 75 and the other blade 81 until the latter angle is zero, with the latter anvil and blade in line contact with each other, as shown in FIG. 14. During this phase, the spring 118 holds the seat 158 of the lower link part 62 in sliding bearing engagement with the lug 152 of the shock absorber spring 140 which, for a reason which will appear, remains stationary in its rearmost position (FIGS. 2 and 8). Due to the sweep of the line 31 and the inertia of the cable anchor 162 and the mine 161, the cable 160 is urged toward the trailing end of the cutter 20, as well as toward that side of the rod 22 which faces the area of sweep, with considerable force tending to increase the angle between the anvil 74 and the blade 80. This force breaks up into components normal respectively to the anvil 74 and blade 80. The blade component is translated into a force, acting on the link 60 at the lever fulcrum axis 58, tending to turn the link clockwise (looking downward) about the shock absorber spring lug axis 155, and the anvil component tends to turn the link counterclockwise about that axis. The link-turning torque due to the anvil component exceeds the link-turning torque due to the blade component, with the result that the link 60 turns counterclockwise about the axis 155.

As the link 60 turns counterclockwise, the roller 89 moves rearward along the rod 22 so that the blade 81 and anvil 75 swing toward each other, and the roller 88 moves forward along the rod so that the blade 80 and anvil 74 recede from each other and thus the cable 160 slides deeper in contact with the blade 80 and anvil 74 until the movement of the cable relative to the blade 80 and anvil 74 is stopped when the blade 81 comes into full line engagement with the anvil 75 (FIG. 14).

The ensuing action, during which the rollers 88 and 89 both move rearward in contact with the sides of the forward rod portion 37 until the roller 89 reaches the ramp 43, may be termed the second phase. During this phase the cutter head assembly 54 moves as a unit with the cable 160 rearward relative to the shock absorber spring lug 152 and without relative movement of the parts of the cutter head assembly other than the rolling of the rollers 88 and 89.

As the relative rearward movement of the cable 160 continues further, commencing the third phase, the rollers 88 and 89 are cammed apart initially momentarily by the ramp 43 and then by said ramp and the ramp 42, causing the blades 80 and 81 to swing toward each other about their respective fulcrums 58 and 59. Inasmuch as the blade 81 and anvil 75 are in mutual line contact at this time, the anvil 74 and blade 80 are thus swung toward each other and progressively squeeze and crush the cable 160 until, at the close of that phase, i.e., when the roller 89 is substantially at the zenith 44 of the ramp 43, the parts are arranged as shown in FIG. 16, and the part of the cable which is between the anvil 74 and the blade 80 is relatively narrow and elongated, longitudinally of the rod 22, as indicated at 166.

The fourth phase starts as the roller 89, which is still closer than the roller 88 to the rear, commences rolling rearward along the ramp 49 of the slow-tapered wedge portion 46. Presently, as this movement progresses, both rollers 88 and 89 are engaged with the wedge portion 46 and continue to be cammed farther apart and consequently the angle between the anvil 74 and the blade 80 is progressively reduced and the blade commences to cut the cable 160 by a slicing action. When the rollers are somewhat short of the zeniths 50 (FIGS. 1 2, and 6) of the ramps 48 and 49 the blade 80 is in lengthwise engagement with the anvil 74 and the cable is completely severed (FIG. 17), ending the fourth phase.

To withstand the crushing and cutting forces to which the lever 56 or 57, as the case may be, is subjected, each lever, at its connection with the link 60, is reinforced by means of a pivot bearing 167 welded to the lever as at 168 and thickened as at 169 toward the rod 22, as in FIGS. 12 and 13. The element 167 serves as a bearing for a pivot sleeve 170 about pivot connecting elements 171 and 172.

It will be recalled that, at the beginning of the second phase, the blade 81 is in line contact with the anvil 75, and the roller 89 is farther to the rear along the rod 22 than is the roller 88. As the camming commences, the blade 80 and anvil 74 proceed to approach each other, and the roller 88 moves rearward faster than hte roller 89 moves rearward, until, when the cable 160 is severed, the rollers are equidistant from the rear of the rod 22. Accordingly, as the crushing and subsequent cutting of the cable 160 take place, the blade 80 is not only approaching the anvil 74 but is moving toward the rear faster than is the anvil, with the result that the cable is being crushed and then cut by a slicing action, which requires considerably less force than is necessary with a non-slicing shearing cut.

As soon as the cable 160 is severed, the loaded spring 118 drives the cutter head assembly 54 forward relative to the rod. Near the end of this return stroke the pivot surface 158 of the lower link part 62 strikes the lug 152 of the shock absorber spring 140 which at the moment of impact is in the bowed relatively relaxed form shown in FIGS. 2, 3, and 8. The impact drives the spring 140 forward along the rod 22 and the spring lug 152 swings the yoke 142 about its pivot 144, with the result that the forward end 173 of the yoke bight 146 moves in an arc forwardly and toward the rod, thereby progressively flattening the spring 140 which in the process absorbs the shock of the impact. Completion of flattening of the spring 140 terminates such rotation of the yoke 142 and accordingly stops the cutter head assembly 54 in a position slightly forward of its normal idle position (FIG. 18). The spring 118 at this point is substantially spent, and the shock absorber spring 140 is loaded and immediately springs back to its initial bowed shape (FIGS. 2 and 8), swinging the yoke 142 rearward to its initial position and moving the cutter head assembly 54 and the retainer 120 and forward end 125 of the spring 118 back to their initial idle positions, so that the cutter 20 is automatically cocked for another cable-crushing and cutting operation.

The rear hanger 30 (FIGS. 1, 2, 9, and 17) has a base 176 superimposed by diagonally opposite mutually adjacent front and rear inverted L-shaped projections or forations 178 and 180 defining and separated by a diagonal slot or space 182 and having complemental substantially semi-cylindrical interior surfaces 184 affording together in effect a cylindrical socket or passage parallel to the axis of the rod 22 and communicating with and interrupted by said space for slidably receiving oppositely facing semi-cylindrical portions of the line 31. The hanger 30 is formed with rounded surfaces where necessary to preclude snagging a mine mooring cable 160 should the cable miss entering the cutter head assembly 54.

The front hanger 26 (FIGS. 1, 2, 5, 10, and 11) comprises a pair of complemental respectively fixed and movable cheeks 186 and 187. The cheek 186 is of inverted L-shape, providing a recess alined with the passage in the hanger 30 and having a full length lateral entrance for the line 31, and the cheek 187 serves as a closure for the entrance. Welded as at 188 or otherwise suitably secured to the inner face of the vertical leg 190 of the cheek 186 is a pair of strips 192 having longitudinally spaced holes 194, the holes of each strip registering with those of the other strip, for the snug reception of the shanks 196 of the fasteners 24. The top leg 198 of the cheek 186 is in the form of a part-cylindrical overhang having holes 200 coaxial with but slightly larger than the respective sets of holes 194 to accommodate the heads 202 of the fasteners 24, whereby the fasteners may be inserted and removed. The vertical leg 190 is punched to provide longitudinally spaced spring tangs 204 (FIG. 11) which are cammed aside by the fastener heads 202 as the fasteners 24 are driven into fastening position, the tangs snapping into retaining position against the chamfered portions 206 of the heads. Pursuant to force applied to the other ends of the fasteners 24, the heads 202 again cam the tangs 204 aside so that the fasteners may be removed.

The forward portion 37 of the rod 22 has holes 208 (FIG. 6) adapted to register with the sets of holes 194 to snugly receive the fastener shanks 196.

To the inner face of the main side portion 210 of the movable cheek 187 is welded as at 212 or otherwise suitably secured a pair of strips 214 arranged to have a sliding fit between the top and bottom 64 and 66 of the forward portion 37 of the rod 22 and the respective strips 192. The strips 214 have registering longitudinally spaced and longitudinally extending slots 216 and 218 of a width to slidably accommodate the fastener shanks 196.

With the rod 22 and cheeks 186 and 187 suitably arranged, the fasteners 24 are driven home to maintain them in assembly as shown particularly in FIGS. 10 and 11.

Each forward slot 216 is open only at a side of its rear end, as indicated at 220 (FIGS. 5 and 10), and each rear slot 218 is closed. The opening 220 is in a position to allow free lateral passage therethrough of the forward fastener 24 when the rear fastener 24 is engaged with the rear end 222 of the rear slot 218, allowing the cheek 187 to pivot freely relative to the cheek 186.

The fixed cheek 186 has an inclined forward edge 224 terminating at an offset upper forwardly projecting spring tongue 226 adjacent the overhang 198. The tongue 226 may be triangular, and, adjacent its anchored end, is bent to provide a vertical socket 228 (FIG. 10) and, forward from the socket, is tapered or flared as at 230 so as to facilitate camming passage therealong of a part to be snapped into the socket, as will appear.

The front edge 232 of the movable cheek 187 is inclined upward and forward and terminates at an upper return bent L-shaped lug 234 whose front arm 236 is in a plane parallel to the edge 232 and whose side arm 238 is spaced from and faces the cheek side portion 210. The side arm 238 may be triangular, in conformity with the tongue 226, with a horizontal upper edge 240 and a vertical rear edge 242 in the form of a lug which projects toward the cheek side portion 210. The cheek 187 has a slight top part-cylindrical overhang 244 for cooperation with the overhang 198 of the cheek 186. The overhangs 198 and 244 terminate in longitudinal surfaces 246 and 248, respectively, which are substantially slidably interengaged.

With the movable cheek 187 of the front hanger 26 in open position (FIG. 5), the cutter 20 may be hung on the sweep line 31 as follows. The cutter 20 is angled relative to the line 31 to position an outboard part of the line in the diagonal slot 182 of the rear hanger 30, and then turned to position said part of the line in the two semicylindrical grooves 184 of the hanger and nest an inboard part of the line in the recess under the overhang 198 of the fixed cheek 186 of the front hanger 26. The movable cheek 187 is then return swung into parallelism with the cheek 186, closing the entrance to the recess, the slot entrance 220 clearing the front fastener 24 so that the movable cheek is in the position indicated in dot-dash lines in FIGS. 5 and 10. At this point the inner part-cylindrical surfaces 252 and 254 of the cheeks 186 and 187 are flush with each other (FIG. 11) and in sliding engagement with the line 31, the outer curved surfaces 256 and 258 of the cheeks are flush with each other, and the lug 242 is in front of the flared portion 230 of the spring tongue 226, the front of the cheek 187 being in advance of the front of the cheek 186. The cheek 186 is then pushed straight back, whereupon the lug 242 cams the spring tongue 226 aside and snaps into the socket 228, thereby releasably yet securely latching the cheeks in operating assembly, as shown in FIGS. 1, 2, and 10.

The cheeks 186 and 187 thus assembled present smooth external flat and rounded surfaces throughout, without projecting parts which might otherwise snag a mine mooring cable 160. Should the cable 160 first contact the line 31 ahead of the hanger 26, the cable at the line-contacting part thereof will be flexed more and more with continued sweep movement of the line 31, inasmuch as the cable anchor 162 remains stationary at the sea bottom and the mine 161 offers a drag, so that the portions of the cable above and below the point of flexure will extend across the front of the hanger. However, due to the downward and rearward inclination at 224 and 232 (FIG. 2) of the front of the hanger 26, the cable part engaging the same will not snag, but, instead, will slide along and cam the adjacent inclined edge of the hanger so as to swing the cutter 20 bodily about the line 31 as an axis and thus the cable will slide along the outer face of the adjacent cheek and pass rearward into wedged position between a blade and the cooperating anvil, as noted above.

The sweep line 31 and all parts of the cutter 20 are preferably formed of rust-resistant material, preferably metal. As it is desirable to support as many of the cutters as possible on a given length of sweep line without excessive sagging of the line, the rod 22 is preferably formed of titanium or a titanium alloy. Due to the slicing action, considerably less force need be exerted by the cutter 20 to cut the cable 160, with the result that the required strength and weight of the cutter parts may be considerably less than is true of conventional cutters, the sweep line may be of substantially smaller diameter, and the cutter is capable of cutting thicker cables, and of cutting cables at a relatively low towing speed. Where a conventional cutter needs a speed of about eight or more knots, the cutter of the present invention is operative at practically any speed, even at one knot or less. The cutter 20 is also capable of cutting armored chain, which is to be considered as broadly embraced in the term "cable" as used herein. The cutter is also capable of being used on a sweep line towed by a helicopter. Due to the relatively light tension imposed on the sweep line, and the consequently thin sweep line that may be employed, there is no appreciable problem of drag and twist of the line in the wrong direction such as is inherent where relatively large (about 1" diameter) sweep lines are required as with serrated V-type cutters.

Obviously many modifications and variations of the present invention are possible in the light of the above teachings. It is therefore to be understood that within the scope of the appended claims the invention may be practiced otherwise than as specifically described.

We claim:

1. In a mine sweeping apparatus, a mine mooring cable cutter supported by a sweep line, said cutter comprising a rod extending lengthwise of the line, a pair of cable-cutting jaws supported by and movable along the rod, means biasing the jaws apart horizontally to receive a mine mooring cable regardless of the speed of sweep, means resiliently resisting longitudinal movement of the rod relative to the jaws, the second means being yieldable to inertial pressure of the cable against the jaws as the line continues its sweep, and means on the rod and jaws for closing the jaws to sever the cable therebetween during such relative movement.

2. The structure of claim 1, characterized in that the second means is operative on severing of the cable to effect return movement of the jaws longitudinally of the rod, the first means being operative to open the jaws on such return movement, together with shock absorber means for arresting the return of the jaws by the second means.

3. The structure of claim 1, characterized in that the second means is operative on severing of the cable to effect return movement of the jaws longitudinally of the rod, the first means being operative to open the jaws on such return movement, together with shock absorber means including a spring for arresting the return of the jaws by the second means and for re-cocking the shock absorber means.

4. In a mine sweeping apparatus, a mine mooring cable cutter supported by a sweep line and comprising a rod extending lengthwise of and pivotally suspended from the line, a pair of cable-cutting jaws supported by the rod, means biasing the jaws apart horizontally to straddle a mine mooring cable, the jaws and rod being capable of relative movement lengthwise of the rod, means yieldably resisting such relative movement in one direction, the second means being yieldable in response to inertial pressure of the cable against the jaws as the line continues its sweep, and means on the rod and jaws for imparting combined mutual approach and relative longitudinal movement of the jaws to saw the cable through as the sweep progresses.

5. The structure of claim 4, characterized in that the second means is operative on severing of the cable to effect return movement of the jaws longitudinally of the rod, the first means being operative to open the jaws on such return movement, together with shock absorber means for arresting the return of the jaws.

6. In a mine mooring cable cutting apparatus, a rod having front and rear ends and parallel top and bottom faces bisected by a longitudinal plane of symmetry, the rod having a first portion of uniform width, a truncated fast-tapering first wedge merging with and diverging rearward from the rear end of the first portion, a truncated slow-tapering second wedge merging with and diverging rearward from the wide end of the first wedge, and a second portion of uniform width merging with the wide end of the second wedge, a stop on the rod, a cutter head carried by the rod, the rod and head being relatively movable longitudinally of the rod, a spring biasing the head forward relative to the rod to a position ahead of the first wedge and initially holding the head against the stop, the head comprising a link, means for fulcruming the link about an axis normal to the faces and in said plane when the head is limited by the stop, the link having a tongue extending along a face of the rod, the tongue having right and left jaws, right and left levers intermediately pivoted to the link about axes parallel to the fulcrum axis, and at opposite sides of the rod, the lever pivot axes defining a plane rearward of the jaws, the distance between the lever pivot axes exceeding the width of the second portion, the levers having forward arms providing right and left blade jaws facing the respective right and left jaws of the tongue, the right jaws constituting one pair and the left jaws constituting a second pair, means holding the rear arms of the levers against the sides of the rod, the head being symmetrical relative to said plane and cocked when the head is engaged with the stop and the apparatus is idle, with the jaws of each pair open at an angle to receive a mine mooring cable, whereby, when a mine mooring cable is received between and engages a pair of jaws, the resulting inertial pressure of the cable against the receiving jaws will initially turn the head about the fulcrum axis and spread the receiving jaws farther open and the other pair of jaws will come into mutual line contact, then the rod will move in a forward direction parallel to said plane while the cable restrains the head with the head in the condition just mentioned until the first wedge encounters the rear arm of the lever whose jaw is out of engagement with the cable, then the first wedge will actuate the latter lever and then both levers to crush, without cutting, the cable between the receiving jaws, then the second wedge will actuate the levers to sever the crushed part of the cable, then the spring will drive the head to the stop and thereby recock the head.

7. In a mine sweeping apparatus, a sweep line, a mine mooring cable cutter supported by the line and comprising two pairs of jaws, means for yieldably holding the jaws of each pair horizontally apart, one pair at each side of the line for selectively receiving a mine mooring cable, depending on the side of the line facing the direction of sweep, means for guiding the cable to a position between the jaws at the sweep side of the line, and means including the non-selected pair of jaws for operating the cable-receiving jaws to sever the cable therebetween as the line progresses in its sweep.

8. In a mine sweeping apparatus, a horizontal rod having forward and rear ends and rearwardly diverging sides, a cutter head carried by and movable along the rod and comprising a pair of members pivotally connected together about a vertical axis, the members having mutually facing jaws forward of the axis, means biasing the jaws in forwardly divergent relation, jaw-actuating means connected to the jaws and engaging the sides of the rod rearward of the axis for forcing the jaws toward each other as the rod moves forward relative to the head, and means biasing the jaw-actuating means against the sides of the rod.

9. In a mine sweeping apparatus, a mine mooring cable cutting device comprising a horizontal rod having forward and rear ends and rearwardly diverging sides spaced rearward from the forward end, a cutter head carried by and movable along the rod, means biasing the head to a position forward of the diverging sides, the head comprising a link extending laterally across the rod, levers intermediately pivoted to the link about vertical axes spaced apart laterally of the rod, the link having a portion extending forward relative to the axes, said portion having jaws at its longitudinal margins, the levers having arms extending forward from the axes, the forward arms having jaws facing the respective first-mentioned jaws, each lever jaw and the link jaw facing it constituting a pair of jaws, means biasing the rear arms of the levers against the sides of the rod and biasing each pair of jaws open in forwardly diverging relation to receive a mine mooring cable when the head is in its foremost position in the absence of a mine mooring cable, and a stop limiting forward movement of the head relative to the rod.

10. The structure of claim 9, together with means for preventing a cable from engaging the rod while the cable is between a pair of jaws.

11. The structure of claim 9, together with a member pivoted to said portion about a vertical axis, means providing a sliding pivot connection between said member and the rod about a vertical axis forward of the pivot connection between said member and said portion and confining the sliding pivot axis to the vertical plane of the rod axis, and interengageable means on said member and said portion for limiting relative pivotal movement in each direction between said member and said portion, the cable-engaging faces of the link jaws at each such limit being disposed laterally outboard of the adjacent side portions of the rod until the cable is severed.

12. The structure of claim 9, characterized in that the portions of said rear arms which engage the sides of the rod are rollers.

13. The structure of claim 9, together with a sweep line, means for towing the sweep line and holding the line submerged at a level for sweeping a mine field, means connected to the rod and looped over the line and swingably suspending the rod from the line with the rod extending lengthwise of the line, and means on the line for engaging a rearwardly facing part of the rod to limit rearward movement of the rod relative to the line.

14. In a mine sweeping apparatus, a finless mine mooring cable cutter comprising a pair of jaws, means including a sweep line supporting the cutter with the jaws in substantially horizontally spaced relation regardless of the speed of sweep and in position to receive a mine mooring cable, means for partially closing the jaws to crush the cable therebetween to substantially reduced thickness without substantially cutting it, and means for completing closure of the jaws to sever the cable.

15. In a mine sweeping apparatus, a mine mooring cable cutter comprising two pairs of jaws, means including a sweep line supporting the jaws of each pair in substantially horizontally spaced relation, with one pair of jaws at one side and the other pair of jaws at the other side of the line, so that one or the other pair of jaws will selectively receive a mine mooring cable, depending on which pair of jaws is at the side being swept, means including the non-selected pair of jaws for partially closing the selected pair of jaws to crush the cable therebetween to substantially reduced thickness without cutting it, and means including the non-selected pair of jaws for completing closure of the selected pair of jaws to completely sever the cable.

16. In a mine sweeping apparatus, a sweep line, a mine mooring cable cutter supported by the line, said cutter comprising a rod extending lengthwise of the line, a pair of cable-receiving and cutting jaws confined to and movable along the rod, means biasing the jaws horizontally open, means on the jaws and rod for closing the jaws and severing the cable therebetween as the rod moves with continued sweep while the jaws are restrained by the inertia of the cable therebetween, and means for reversing the relative movement between the rod and the jaws on severing of the cable.

17. The structure of claim 16, together with shock-absorber means for arresting such reversal.

18. In a mine sweeping apparatus, a continuous sweep line having a knob secured thereabout and reelable in and out with the line, and a mine mooring cable cutter looped over the line and abutting the knob during the cable cutting operation, the cutter having means enabling the cutter as a unit to be readily slipped onto and off the line, whereby the cutter can be readily mounted on the line for use and readily uncoupled from the line to enable the line and knob to be reeled in.

19. In a mine sweeping apparatus, a continuous sweep line, and a mine mooring cable cutter supported by and movable along the line and swingable about the line as an axis by the sweep movement of the line and the inertia of a cable in the cutter, and means on the line for limiting movement of the cutter in one direction along the line by the sweep movement and the inertia of the cable.

20. In a mine sweeping apparatus, a continuous sweep line, means supporting a portion of the line in substantially horizontal sweeping arrangement, and a pocket for receiving a mine mooring cable and being supported by the line portion for rotation relative to the line portion about an axis extending lengthwise of the line portion, whereby the pocket is rockable by the inertia of the received cable with the progress of the sweep without causing twist of the line portion, the pocket being biased to a predetermined rotary position relative to the axis, irrespective of the speed of sweep, and being vertically open to straddle the cable when the pocket is in said position.

21. In a mine sweeping apparatus, a continuous sweep line, means supporting a portion of the line in substanially horizontal sweeping position, and a pocket for recovering a mine mooring cable and being journaled on the line portion, whereby the pocket is rockable by the inertia of the received cable with progress of the sweep without causing twist of the line portion, the pocket being gravitationally biased to a predetermined rotary position relative to the line portion irrespective of the speed of sweep, and being vertically open to receive and straddle a mine mooring cable when the pocket is in said position.

22. In a mine sweeping apparatus, a mine mooring cable cutter having means for looping the cutter over a continuous sweep line, said means having a passage through which the sweep line is to extend when the cutter is in operative position to receive a mine mooring cable, said means comprising a pair of complemental inverted mutually adjacent L-shaped formations, each having a first leg and a second leg, the first legs defining respectively two opposite sides of the passage, the second legs defining a third side of the passage, said third side being the top of the passage when the cutter is in operative position, each second leg extending toward the side defined by the first leg of the other formation, the formations defining between them a space transverse to and communicating with the passage, the passage and space being dimensioned to accommodate the sweep line, whereby, when the sweep line is horizontal, said means may be hung on the sweep line by holding the cutter with said transverse space parallel to and below the sweep line, raising the cutter to enable the sweep line to be received in said transverse space entirely below the second legs, and then turning the cutter about a vertical axis to lodge the sweep line in and along the passage.

23. The structure of claim 22, the cutter further comprising means remote from the looping means and having a recess alined with the passage and having a lateral entrance throughout the length of the recess for enabling a part of the line by direct transaxial movement to enter and extend along the recess while another part of the line is lodged in the passage, and a closure for the entrance.

24. The structure of claim 23, characterized in that the closure is readily movable to inoperative position, whereby the cutter may be readily mounted on and dismounted from the line.

References Cited in the file of this patent

UNITED STATES PATENTS

| | | |
|---|---|---|
| 843,359 | Petrie | Feb. 5, 1907 |
| 1,735,317 | Helwig et al. | Nov. 12, 1929 |
| 2,396,707 | Kurtz | Mar. 19, 1946 |
| 2,396,731 | Wiener | Mar. 19, 1946 |
| 2,396,732 | Wiener | Mar. 19, 1946 |
| 2,420,987 | Temple | Mar. 20, 1947 |

FOREIGN PATENTS

| | | |
|---|---|---|
| 17,886 | Great Britain | 1915 |
| 294,010 | Germany | Nov. 1, 1919 |
| 488,865 | Germany | Jan. 3, 1930 |